US010280986B2

(12) United States Patent
Palazzolo et al.

(10) Patent No.: US 10,280,986 B2
(45) Date of Patent: May 7, 2019

(54) ACTUATOR MECHANISM FOR TRANSFER CASE

(71) Applicant: BorgWarner Inc., Auburn Hills, MI (US)

(72) Inventors: Michael Robert Palazzolo, Madison Heights, MI (US); Paul Matthew Riggs, West Bloomfield, MI (US); Christopher Anthony Chirco, Romeo, MI (US)

(73) Assignee: BorgWarner Inc., Auburn Hills, MI (US)

( * ) Notice: Subject to any disclaimer, the term of this patent is extended or adjusted under 35 U.S.C. 154(b) by 103 days.

(21) Appl. No.: 15/429,689

(22) Filed: Feb. 10, 2017

(65) Prior Publication Data

US 2017/0234374 A1 Aug. 17, 2017

Related U.S. Application Data

(60) Provisional application No. 62/294,432, filed on Feb. 12, 2016.

(51) Int. Cl.
*B60K 17/34* (2006.01)
*B60K 23/08* (2006.01)
(Continued)

(52) U.S. Cl.
CPC ............ *F16D 23/12* (2013.01); *B60K 17/344* (2013.01); *B60K 17/3467* (2013.01);
(Continued)

(58) Field of Classification Search
CPC ....... B60K 17/344–17/35; B60K 23/08; B60K 23/0808; F16D 23/12; F16D 2023/123; F16D 13/52; F16D 28/00
See application file for complete search history.

(56) References Cited

U.S. PATENT DOCUMENTS 9,186,987 B2 11/2015 Mastie et al.
9,441,726 B1 * 9/2016 Palazzolo ........... F16H 57/0436
(Continued)

FOREIGN PATENT DOCUMENTS

DE 38 15 225 C2 7/1990
DE 10 2015 222 146 A1 5/2016

*Primary Examiner* — David R Morris
(74) *Attorney, Agent, or Firm* — Young Basile Hanlon & MacFarlane, P.C.

(57) ABSTRACT

An actuator for a transfer case includes an actuator member, a face cam mechanism, and a motor. The actuator member includes a circumferential flange and an annular body extending from an inner periphery of the circumferential flange. The annular body includes a circumferential slot opposite the flange defined between two end walls formed by the annular body. One of the end walls includes a bearing member coupled thereto. The face cam mechanism includes a follower coupled to a cam member. The cam member is configured to displace axially when rotated. The follower is disposed within the slot. In a first range of motion, the annular member is rotated independent of the face cam mechanism. In a second range of motion, the bearing member engages the follower to rotate the second cam member relative to the first cam member, and the follower moves axially along the bearing member.

16 Claims, 10 Drawing Sheets

(51) Int. Cl.

| | |
|---|---|
| ***F16D 23/12*** | (2006.01) |
| ***F16D 28/00*** | (2006.01) |
| ***B60K 17/344*** | (2006.01) |
| ***F16D 13/52*** | (2006.01) |
| ***F16H 1/00*** | (2006.01) |
| ***B60K 17/346*** | (2006.01) |
| *B60K 17/02* | (2006.01) |

(52) U.S. Cl.

CPC .............. *B60K 23/08* (2013.01); *F16D 13/52* (2013.01); *F16D 28/00* (2013.01); *F16H 1/00* (2013.01); *B60K 17/02* (2013.01); *B60K 23/0808* (2013.01); *B60K 2023/0825* (2013.01); *B60K 2023/0858* (2013.01); *B60Y 2400/405* (2013.01); *F16D 2023/123* (2013.01)

(56) References Cited

U.S. PATENT DOCUMENTS

| | | | | |
|---|---|---|---|---|
| 9,447,873 | B2 | 9/2016 | Pritchard | |
| 9,463,691 | B1 * | 10/2016 | Mastie | B60K 23/08 |
| 9,475,385 | B1 * | 10/2016 | Pritchard | B60K 17/344 |
| 9,964,160 | B2 * | 5/2018 | Palazzolo | B60K 17/35 |
| 10,023,050 | B1 * | 7/2018 | Sullivan | B60K 23/08 |
| 2005/0202919 | A1 | 9/2005 | Mueller et al. | |
| 2006/0011001 | A1 * | 1/2006 | Showalter | B60K 23/0808 74/23 |
| 2006/0011441 | A1 * | 1/2006 | Showalter | B60K 17/3467 192/84.6 |
| 2006/0247082 | A1 | 11/2006 | Mueller et al. | |
| 2015/0158383 | A1 * | 6/2015 | Mastie | B60K 17/3467 475/204 |
| 2015/0159751 | A1 * | 6/2015 | Pritchard | B60K 17/3467 475/150 |
| 2016/0131253 | A1 * | 5/2016 | Pritchard | F16H 61/32 74/665 F |
| 2017/0158052 | A1 * | 6/2017 | Hamilton | B60K 17/344 |
| 2017/0158053 | A1 * | 6/2017 | Bunyan | B60K 17/344 |
| 2017/0232840 | A1 * | 8/2017 | Pritchard | B60K 17/344 74/665 GE |
| 2017/0234373 | A1 * | 8/2017 | Palazzolo | B60K 17/35 192/84.6 |
| 2017/0234374 | A1 * | 8/2017 | Palazzolo | F16D 13/52 192/84.6 |
| 2017/0240043 | A1 * | 8/2017 | Pritchard | B60K 17/344 |
| 2017/0241486 | A1 * | 8/2017 | Pritchard | B60K 17/02 |
| 2018/0010649 | A1 * | 1/2018 | Sullivan | B60K 17/344 |
| 2018/0010682 | A1 * | 1/2018 | Pritchard | B60K 17/02 |
| 2018/0194223 | A1 * | 7/2018 | Sullivan | B60K 23/08 |

* cited by examiner

ACTUATOR MECHANISM FOR TRANSFER CASE

CROSS-REFERENCE TO RELATED APPLICATIONS

This application claims priority to and the benefit of U.S. Provisional Application No. 62/294,432, filed Feb. 12, 2016, the disclosure of which is incorporated herein by reference in its entirety.

BACKGROUND

In the field of vehicle drivetrain components, a transfer case is an apparatus that distributes driving power to more than one driven axle of the vehicle. A typical transfer case receives driving power from the transmission of the vehicle and transfers that power to a primary output shaft that is driven constantly, for example, during operation of the vehicle in a two-wheel drive mode, and a secondary output shaft that is driven selectively using a clutch, for example, during operation of the vehicle in a four-wheel drive mode. In addition, two-speed transfer cases provide gear reduction to allow operation in a high range, which is typically a 1:1 drive ratio, or a low range, such as a 2:1 drive ratio.

It would be advantageous to provide a transfer case with a single actuator that both selects the drive ratio and selectively engages the secondary output shaft.

SUMMARY

A transfer case includes an input shaft, a primary output shaft, a secondary output shaft, and an actuator. The primary output shaft is coupled to the input shaft. The secondary output shaft is selectively coupleable to the primary output shaft with a secondary torque transfer mechanism to transfer torque from the primary output shaft to the secondary output shaft. The actuator comprises a hub member and a cam mechanism. The hub member includes an annular body defining a circumferential slot between having an end wall formed by the annular body. A bearing member is coupled to the end wall and includes a bearing surface extending in an axial direction relative to the annular body. The face cam is configured to operate the secondary torque transfer mechanism. The face cam mechanism includes a first cam member, a second cam member, and a follower member coupled to the second cam member. The second cam member is configured to displace axially away from the first cam member when rotated relative to the first cam member. The hub member is configured to rotate in a first range of motion and a second range of motion. In the first range of motion, the hub member rotates independent of the face cam mechanism with bearing member not engaging the follower. In a second range of motion, the bearing member engages the follower to rotate the second cam member relative to the first cam member. The follower is configured to move axially along the bearing surface of the bearing member engaged thereby in the second range of motion. The bearing member may be formed from a material that is harder than another material forming the annular body of the hub member, and is configured to distribute localized force from the follower across the end wall.

An actuator for a transfer case includes an actuator member, a face cam mechanism, and a motor. The actuator member includes a circumferential flange and an annular body extending from an inner periphery of the circumferential flange. The annular body includes a circumferential slot opposite the flange defined between two end walls formed by the annular body. One of the end walls includes a bearing member coupled thereto, which forms a bearing surface extending in an axial direction relative to the annular body. The face cam mechanism includes a first cam member, a second cam member, and a follower coupled to the second cam member. The second cam member is configured to displace axially relative to the first cam member when the second cam member is rotated relative to the first cam member. The follower is disposed within the slot. The motor is configured to rotate the member in a first range of motion and in a second range of motion. In the first range of motion, the annular member is rotated independent of the face cam mechanism. In the second range of motion, the bearing member engages the follower to rotate the second cam member relative to the first cam member. The follower moves axially along the bearing surface of the bearing member in the second range of motion. The bearing surface may be formed from a material that is harder than another material forming the end wall to which the bearing member is coupled.

A transfer case includes a primary output shaft, a secondary output shaft, and an actuator. The secondary output shaft is selectively coupleable to the primary output shaft with a secondary torque transfer mechanism to transfer torque from the primary output shaft to the secondary output shaft. The actuator includes a hub member, a bearing member, and a face cam mechanism. The hub member includes an annular body defining a circumferential slot having a bearing member coupled to the annular body and positioned in the slot. The bearing member includes a bearing surface that extends in an axial direction relative to the annular body. The face cam mechanism displaces in the axial direction when rotated by the hub member to operate the secondary torque transfer mechanism. The face cam mechanism includes a follower member that is engaged by the bearing member and moves axially along the bearing surface when the face cam is rotated by the hub member.

The annular member may include an end wall at a circumferential end of the circumferential slot, the bearing member may be formed from a material that is harder than another material forming the end wall, and the bearing member may distribute localized force from the follower across the end wall. The bearing member may include a bearing segment forming the bearing surface, and include a coupling segment coupled to the annular body. The bearing segment may include a rear surface opposite the bearing surface with the rear surface being engaged with the end wall to distribute force thereacross. The bearing member may have a cross-sectional profile extending in the axial direction. The bearing member may be coupled to the annular member by at least one of a fastener or the coupling segment being received within a complementary slot of the annular body. The fastener may be a clip member received within an annular groove in the annular body.

The hub member may also be configured to rotate in a first range of motion independent of the face cam mechanism in which the bearing member does not engage the follower, and in a second range of motion in which the bearing member engages the follower to rotate the face cam mechanism. The secondary torque transfer mechanism may include a plate clutch, and in the second range of motion, the face cam mechanism displaces axially to compress the plate clutch to selectively couple the primary output shaft to the secondary output shaft. The secondary torque transfer mechanism may include a first sprocket coupled to a housing of the plate clutch to be selectively coupled to the primary output shaft, include a second sprocket coupled to the secondary output shaft, and include a chain coupling the first sprocket to the second sprocket to transfer torque therebetween.

The follower may be a roller configured to roll along the bearing surface.

The hub member may include two slots, each slot being defined by two end walls and having one of the bearing members coupled to each end wall. The face cam mechanism may include two followers that are rollers with each follower being positioned in one of the two slots and being configured to roll along the bearing surface of each bearing member of the slot in which the roller is positioned. The transfer case may further include an input shaft and a gear reduction mechanism configured to couple the input shaft to the primary output shaft selectively between a first drive ratio and a second drive ratio. The actuator may be configured to operate the gear reduction mechanism in a first range of motion to selectively couple the input shaft to the primary output shaft in the first drive ratio or the second drive ratio, and to operate the secondary torque transfer mechanism in a second range of motion that is different from the first range of motion.

The face cam mechanism may include a first cam member and a second cam member. The first cam member is fixed axially with respect to the hub, the follower is coupled to the second cam member, and the second cam member is rotatable by the hub relative to the first cam member to displace axially relative to the first cam member.

An actuator for a transfer case includes an actuator member, a face cam mechanism, and a motor. The actuator member includes a circumferential slot defined between two end walls formed by the annular body with at least one of the end walls having a bearing member coupled thereto and forming a bearing surface extending in an axial direction relative to the annular body. The face cam mechanism includes a first cam member, a second cam member, and a follower coupled to the second cam member. The second cam member is configured to displace axially relative to the first cam member when rotated relative to the first cam member with the follower being disposed within the slot. The motor is configured to rotate the annular member in a first range of motion independent of the face cam mechanism and in a second range of motion in which the bearing member engages the follower to rotate the second cam member relative to the first cam member and in which the follower moves axially along the bearing surface of the bearing member.

The bearing surface may be formed from a material that is harder than another material forming the end wall to which the bearing member is coupled. The bearing member may have a cross-sectional shape extending in an axial direction. The bearing member may include a bearing segment and a coupling segment with the coupling segment being coupled to the annular body, and the bearing segment forming the bearing surface and a rear surface engaged with the end wall. The actuator member and the second cam member may rotate about a common axis.

A transfer case includes a primary output shaft, a secondary output shaft, a torque transfer mechanism, and an actuator. The torque transfer mechanism selectively couples the primary output shaft to the secondary output shaft to transfer torque therebetween. The actuator includes a face cam, an annular member, a bearing member, and an electric motor. The face cam displaces axially when rotated for operating the torque transfer mechanism. The face cam includes a follower that extends radially outward. The annular member includes end walls that define a slot extending circumferentially therebetween. The follower is positioned in the slot. The bearing member is coupled to one of the end walls and extends in an axial direction relative to the annular member. The bearing member is harder than the end wall. The electric motor rotates the annular in a first range of motion in which the face cam is stationary and in a second range of motion in which the bearing member engages the follower to rotate the face cam and in which the follower moves axially along the bearing member.

BRIEF DESCRIPTION OF THE DRAWINGS

The description herein makes reference to the accompanying drawings, wherein like referenced numerals refer to like parts throughout several views, and wherein.

DETAILED DESCRIPTION

Figure 1:
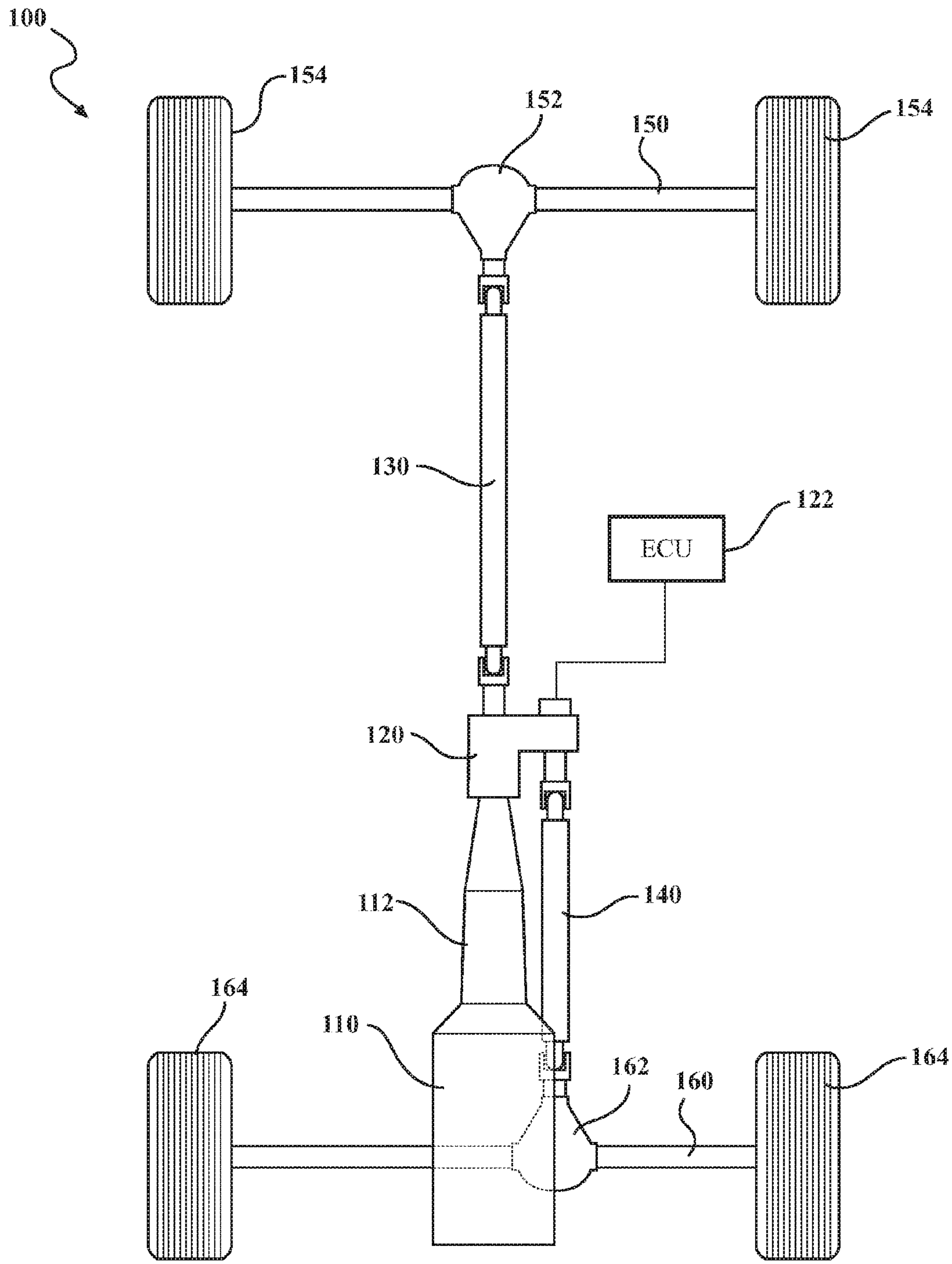
FIG. 1 is a plan view illustration showing a drivetrain that includes a transfer case.

FIG. 1 is a plan view illustration showing a drivetrain 100 for a four-wheel drive vehicle. The drivetrain 100 includes an engine 110 that is coupled to a transmission 112. The engine 110 is the prime mover of the drivetrain 100 and can be, for example, an internal combustion engine, an electric motor/generator, or a combination of the two. Other types of prime movers can be utilized as the engine 110 to provide driving power (e.g. via a rotating output shaft) to the transmission 112. The transmission 112 includes components operable to convert the speed and torque of the driving power provided by the engine 110, such as by a gear train that provides multiple gear ratios. As examples, the transmission 112 can be a manual transmission, an automatic transmission, a semi-automatic transmission, a continuously variable transmission, or a dual clutch transmission.

The transmission 112 provides driving power to a transfer case 120. The transfer case 120 is operable to distribute driving power to a rear driveshaft 130 and a front driveshaft 140. The transfer case 120 can, in some implementations, include components that allow the transfer case to perform a mode shift between two or more different modes. For example, the transfer case 120 can allow operation in a rear-wheel drive or two-wheel drive mode, in which only the rear driveshaft 130 receives driving power and the front driveshaft 140 does not, and a four-wheel drive mode, in which the rear driveshaft 130 and the front driveshaft 140 both receive driving power. In this example, the rear driveshaft 130 is the primary driveshaft and the front driveshaft 140 is the secondary driveshaft. In other implementations, the front driveshaft 140 is the primary driveshaft and the rear driveshaft 130 is the secondary driveshaft, and the transfer case 120 performs a mode shift between a front-wheel drive mode and a four-wheel drive mode. In other implementations, the transfer case 120 does not include components that allow a mode shift, and the transfer case 120 constantly provides driving power to both the rear driveshaft 130 and the front driveshaft 140.

The transfer case 120 can allow a range shift that selectively provides gear reduction to the rotational output of the transfer case 120. For example, the transfer case can include components for operating in a high range, such as a 1:1 drive ratio, or a low range, such as a 2:1 drive ratio. The range shift changes the transfer case 120 between operation in the low range and the high range by selectively coupling and uncoupling a gear reduction mechanism of the transfer case 120.

Operation of the transfer case 120 can be regulated by a controller such as an ECU 122 that provides signals to components of the transfer case 120 to cause the mode shift and/or the range shift. In other implementations, the mode shift and/or the range shift can be actuated mechanically such as by a driver-operated lever that is mechanically connected to a component of the transfer case 120.

The rear driveshaft 130 provides driving power to a rear axle 150 via a rear differential 152. The rear axle 150 can be, for example, a solid axle or a pair of independent half axles. The rear axle 150 provides driving power to a pair of rear wheels 154 that are fitted with tires. The front driveshaft 140 provides driving power to a front axle 160 via a front differential 162. The front axle 160 can also be, for example, a solid axle or a pair of independent half axles. The front axle 160 provides driving power to a pair of front wheels 164 that are fitted with tires.

Figure 2:
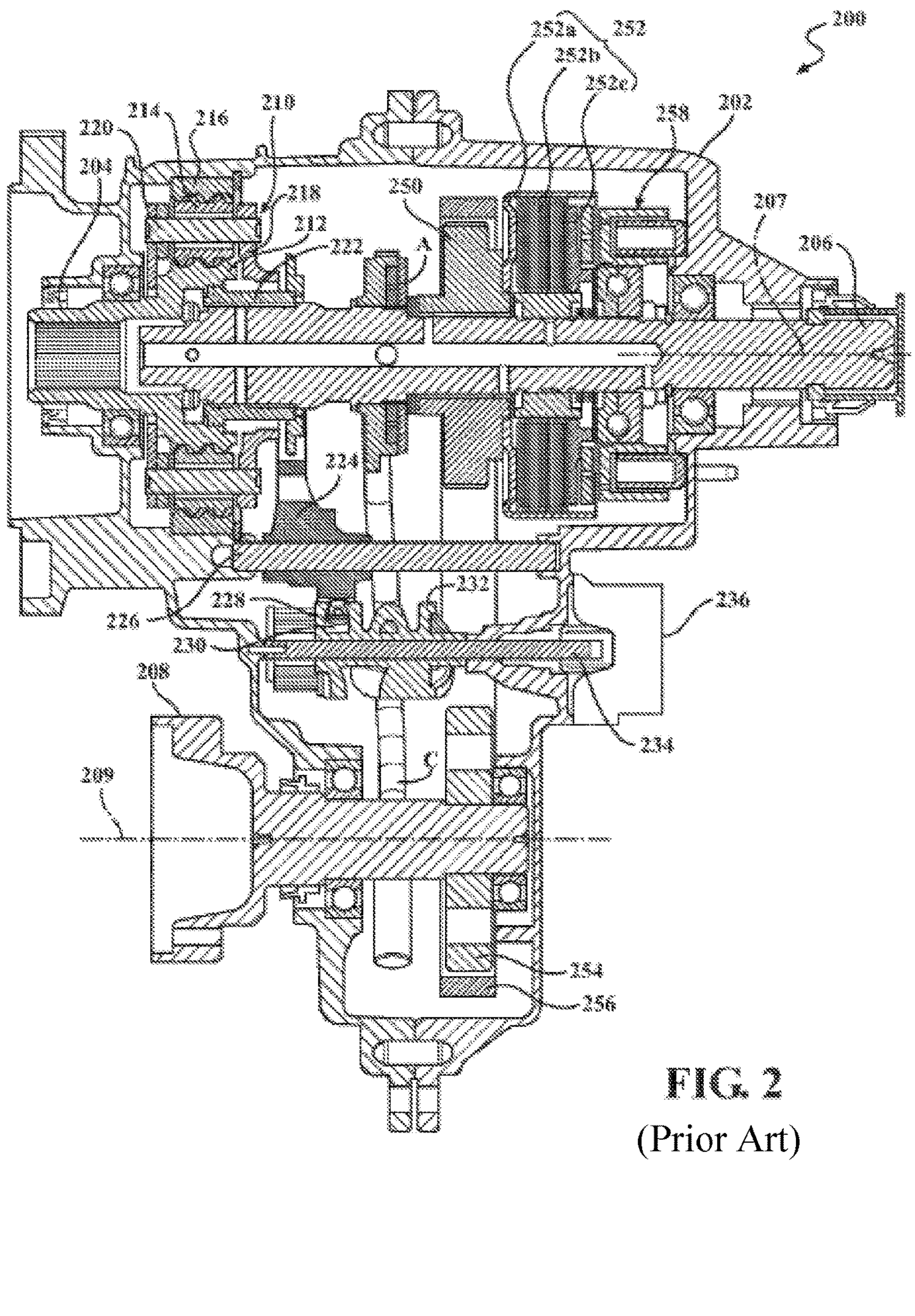
FIG. 2 is a cross-section illustration showing a transfer case having a conventional actuation system.

As shown in FIG. 2, the transfer case 200 generally includes a gear reduction system or mechanism 210 and a secondary torque transfer system or mechanism. The gear reduction system 210 is configured to transfer torque selectively at different drive ratios from an input shaft 204 to a primary output shaft 206, and is operable by a reduction actuation mechanism. The secondary torque transfer system is configured to selectively transfer torque between the primary output shaft 206 (e.g., the rear output shaft) and a secondary output shaft 208 (e.g., the front output shaft), and is operable by a torque transfer actuation mechanism. In the discussion that follows, directional terminology (e.g., front, forward, back, rearward, etc.), though referring to an orientation in which the transfer case might may be installed in a vehicle (e.g., in the cross-sections shown in FIGS. 2 and 3, the left side is the front of the transfer case, while the right side is the rear of the transfer case), such directional terminology is for reference only, as other mounting orientations of the transfer cases are possible.

The transfer case 200 includes a housing 202 and rotating components including an input shaft 204, a primary output shaft 206, and a secondary output shaft 208 that each extend out of the housing 202. The input shaft 204 and the primary output shaft 206 extend along a first axis 207. The secondary output shaft 208 extends along a second axis 209 which is, in this example, parallel to the first axis 207. Together, the input shaft 204, the primary output shaft 206, and the secondary output shaft 208 form a power transfer assembly.

The input shaft 204 is at least partially hollow, and the primary output shaft 206 extends into the hollow interior of the input shaft 204. The input shaft 204 can be connected to the primary output shaft 206 either directly or via a gear reduction mechanism 210. The gear reduction mechanism 210 can be a Ravigneaux planetary gearset that includes a sun gear 212 formed on the input shaft 204, a plurality of planet gears 214, and a ring gear 216 that is fixed to the housing 202. A planet carrier 218 is arranged on the input shaft 204 and can rotate about the input shaft 204. The planet gears 214 are arranged on stub shafts 220 that are connected to the planet carrier 218. The planet gears 214 mesh with the sun gear 212 and the ring gear 216.

A dog clutch mechanism having a gear reduction hub 222 (e.g., dog clutch, coupling, ring) is utilized to engage and disengage the gear reduction mechanism 210. In a first position of the gear reduction hub 222, the gear reduction hub 222 is positioned forward axially (i.e., parallel with the primary output shaft 206) to engage the input shaft 204 and the primary output shaft 206 directly, which establishes a 1:1 drive ratio and does not utilize the gear reduction mechanism 210. In a second position of the gear reduction hub 222 (not shown), the gear reduction hub 222 is shifted axially rearward away from the input shaft 204, and instead engages the planet carrier 218 and the primary output shaft 206. Driving power is thus routed through the gear reduction mechanism 210, with the planet carrier 218 rotating slower than the input shaft 204 to establish a drive ratio such as 2:1.

The reduction actuation mechanism moves gear reduction hub 222 between its first and second positions. In particular, the gear reduction hub 222 is moved by a first selector fork 224 which moves forward and rearward axially along a selector shaft 226. A first cam follower 228 is formed on the first selector fork 224. The first cam follower 228 is disposed in a first groove 230 formed on an exterior surface of a barrel cam 232. The barrel cam 232 is disposed on a rotatable shaft 234 that is rotated by an electric motor 236 in response to control signals from a controller such as the ECU 122 of FIG. 1.

The secondary torque transfer mechanism is configured to transfer torque from the primary output shaft 206 to the secondary output shaft 208. A first sprocket 250 (e.g., rotating member) is arranged on the primary output shaft 206 and connected to the primary output shaft 206 by a plate clutch 252. The second sprocket 254 is arranged on the secondary output shaft 208 and is connected thereto for rotation in unison, such as by splines (not shown). The first sprocket 250 and the second sprocket 254 are connected by a chain 256, such that the secondary output shaft 208 is driven by the primary output shaft 206 via the first sprocket 250, the chain 256, and the second sprocket 254 when the clutch 252 is engaged.

The plate clutch 252 generally includes a housing or drum 252*a*, a plurality of interleaved plates 252*b*, a pressure or apply plate 252*c*, and an actuator 258. The housing 252*a* generally includes a radial base through which the primary output shaft 206 extends, and a concentric or annular flange extending axially away from an outer periphery of the base to form a generally cylindrical housing in which the interleaved plates 252*b* are positioned. The base of the housing 252*a* is coupled to the first sprocket 250 to cause rotation thereof, while the apply plate 252*c* is coupled to the primary output shaft 206 (e.g., through a splined connection) to rotate therewith. The interleaved plates 252*b* alternate between being engaged (e.g., splined) with the primary output shaft 206 and an inner periphery of the housing 252_a_. The actuator 258 is configured to press on the apply plate 252_c_, so as to compress the interleaved plates 252_b_ between the apply plate 252_c_ and the base of the housing 252_a_, so as to increase friction therebetween and transfer torque between the plates 252_b_ splined with primary output shaft 206 and the plates 252_b_ splined with the housing 252_a_. In this manner, torque may be selectively transferred from the primary output shaft 206 to the first sprocket 250 and ultimately the secondary output shaft 208.

Figure 3:
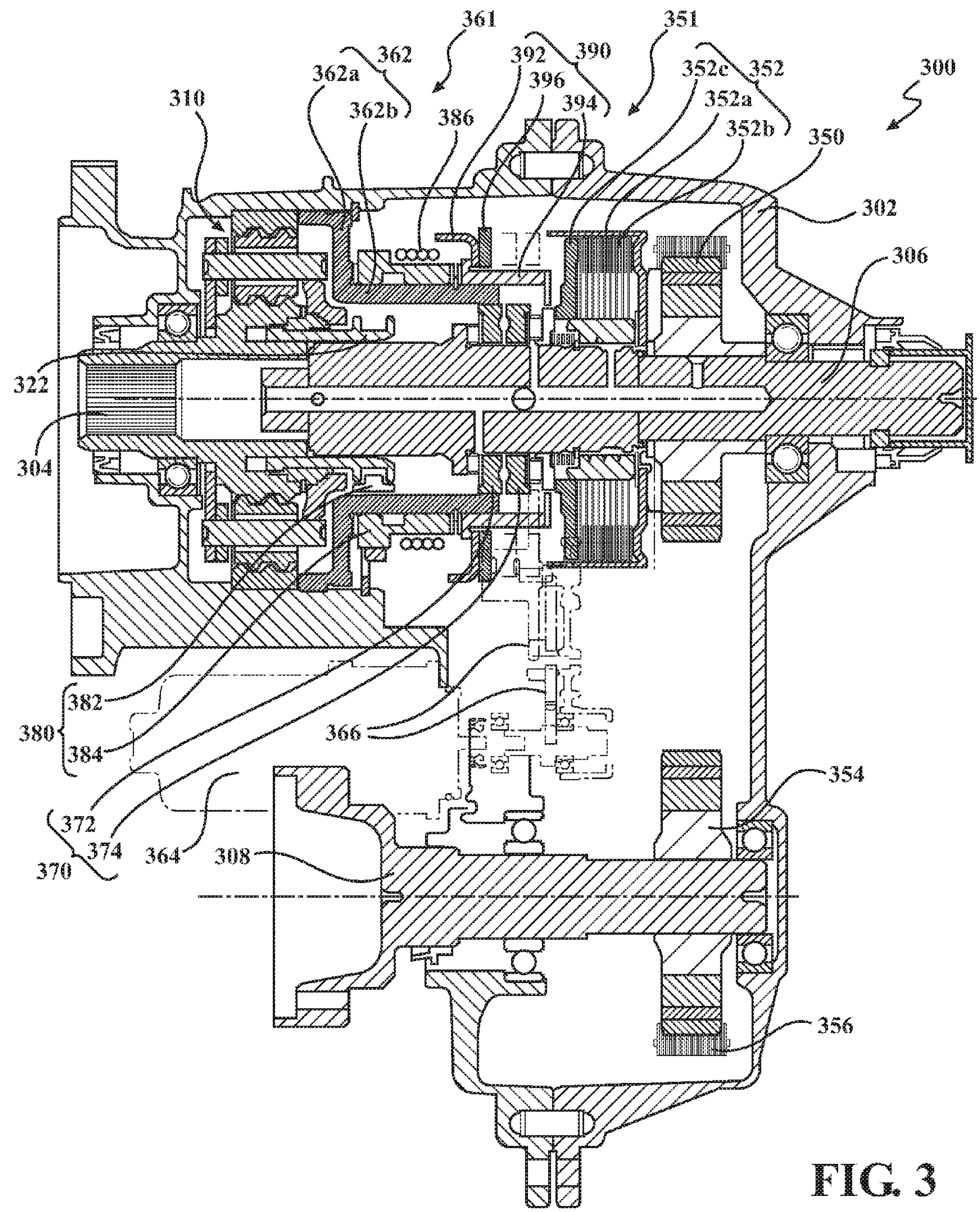
FIG. 3 is a cross-section illustration showing a transfer case having an actuation system according to an exemplary embodiment.
Figure 4:
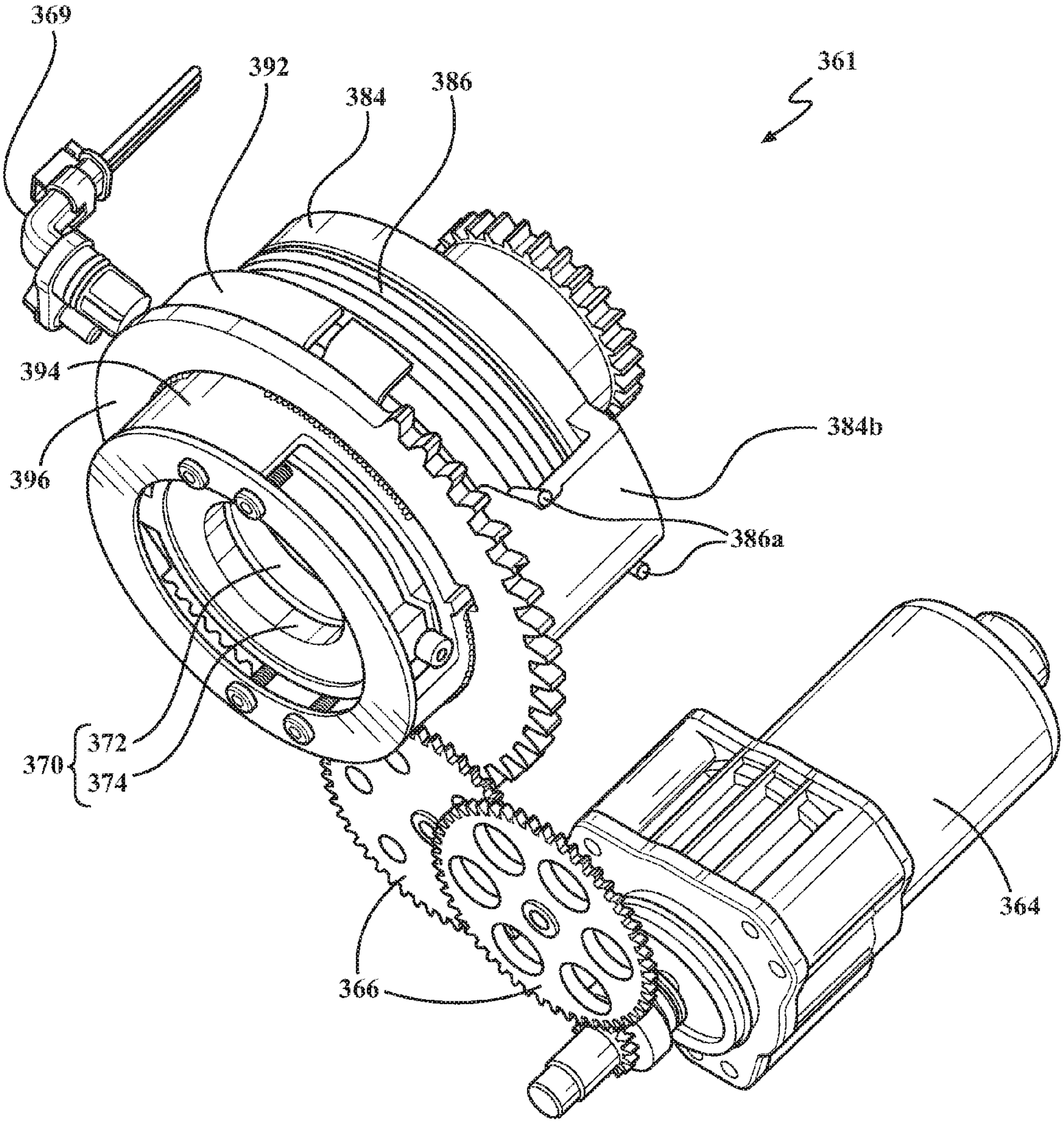
FIG. 4 is a rear perspective view of the actuation system.
Figure 5:
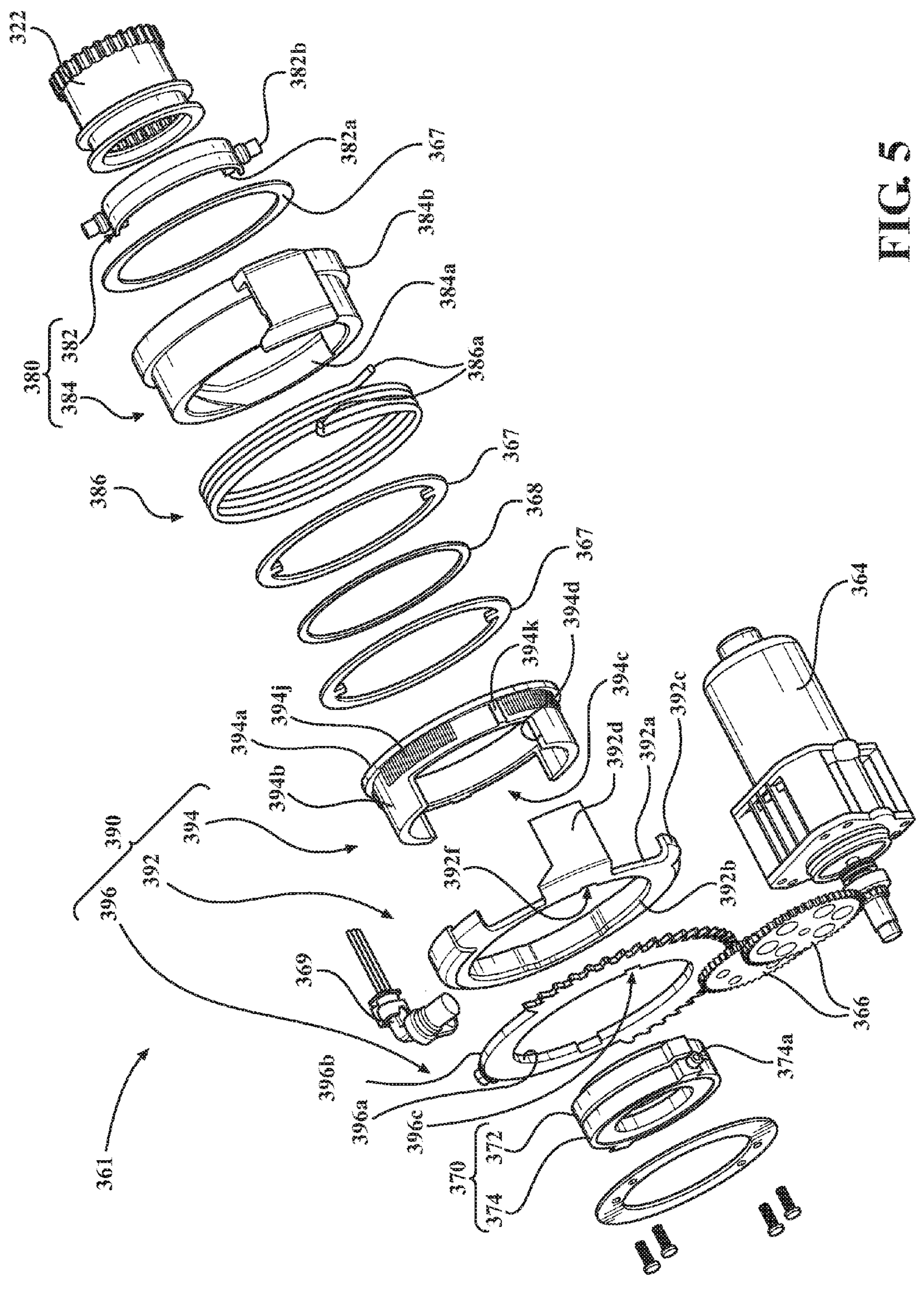
FIG. 5 is an exploded view of the actuation system.

FIG. 3 is a cross-sectional illustration showing the transfer case 300, while FIGS. 4-5 depict an actuation system 361 of the transfer case 300 in isolation. The transfer case 300 generally includes a gear reduction mechanism 310 (i.e., having a planetary gear set) and a secondary torque transfer mechanism 351 (i.e., having a first sprocket 350, plate clutch 352, second sprocket 354 coupled to a secondary output shaft 308, and chain 356), which include similar components and functionality of the gear reduction mechanism 210 and secondary torque transfer mechanism discussed previously (not all components labeled individually). The transfer case 300 also includes an actuation system or mechanism 361 that functions to operate both the gear reduction mechanism 310 and the secondary torque transfer mechanism 351. Components and assemblies of the transfer case 300 having generally the same and/or similar function as those of the transfer case 200 are generally described with common naming and numbering increasing by 100 (e.g., gear reduction mechanism 210 and gear reduction mechanism 310) across different embodiments.

As compared to the transfer case 200, the orientation of the plate clutch 352 and sprocket 350 of the secondary torque transfer mechanism 351 are reversed front to rear with the plate clutch 352 having its apply plate 352_c_ facing forward, and the plate clutch 352 itself being disposed forward of the sprocket 350. The actuation system 361 is generally positioned axially between the gear reduction mechanism 310 and the plate clutch 352. The actuation system 361 engages the reduction hub 322 to operate the gear reduction mechanism 310, and is further configured to engage the apply plate 352_c_ of the plate clutch 352 to operate the secondary torque transfer mechanism 351.

As shown in FIGS. 4-5, the actuation system 361 generally includes an actuator base 362, a motor 364 with reduction gears 366, a secondary torque transfer actuator mechanism 370 (e.g., plate clutch actuator, first actuator mechanism), a gear reduction actuator mechanism 380 (e.g., dog clutch actuator, second actuator mechanism), and a drive gear assembly 390 (e.g., drive assembly). Generally speaking, the motor 364, by way of the reduction gears 366, rotates the drive gear assembly 390, which, in turn, causes sequential (i.e., serial, staged) operation of the gear reduction actuator mechanism 380 and the torque transfer actuator mechanism 370, each stage of rotation generally being associated with one of the actuator mechanisms 370, 380. For example, a first stage is associated with the gear reduction actuator mechanism 380. In the first stage (e.g., first or initial range of motion or rotation; first positive stage and first negative stage), the drive gear assembly 390 is rotated (e.g., +/−between 30 and 50 degrees from center, such as 35 degrees) by the motor 364 via the reduction gears 366 to operate the gear reduction actuator mechanism 380, which moves the gear reduction hub or coupling 322 into the first position (e.g., high range at +35 degrees) or the second position (e.g., low range at −35 degrees). In a second stage (e.g., second, continued, or subsequent range of motion or rotation from ends of the first stage; second positive stage, and second negative stage), the drive gear assembly 390 is further rotated (e.g., +/−an additional 10-30 degrees, such as 25 degrees, meaning +35 degrees to +60 degrees and −35 degrees to −60 degrees) by the motor 364 to operate the secondary torque transfer actuator mechanism 370, which presses the clutch apply plate 352_c_ to compress the interleaved plates 352_b_ within the clutch housing 352_a_. As discussed in further detail below, the torque transfer actuator mechanism 370 and gear reduction actuator mechanism 380 each include cam mechanisms, which include advance and/or retreat movement regions and/or dwell regions that, in conjunction with the drive gear assembly 390, provided for the staged operation.

According to other exemplary embodiments, the various stages of operation of the actuator system 361 may be configured differently, for example, with different ranges of motion in the first and/or second stage (i.e., greater or lesser), different bidirectional ranges for each direction of motion within a given stage (e.g., +35 degrees in the first positive stage, and −25 degrees in the first negative stage), overlapping ranges of motion between stages (e.g., +/−35 degrees in the first stage, and +30 to +60 and −30 to −60 in the second positive and negative stages), with gaps between the ranges of motion (e.g., +/−30 degrees in the first stage, and +35 to +60 and −35 to −60 in the second positive and negative stages), with additional stages (e.g., to operate other actuator mechanisms), and/or with unidirectional stages associated with one or more of the actuator mechanisms (e.g., rotation in only one direction causes the actuator mechanism to operate).

The actuator base 362 is a generally rigid, stationary member that fixedly couples the actuation system or actuator 361 to the housing 302 of the transfer case 300. The actuator base 362 generally includes a base portion 362_a_ (e.g., a forward or radially outer portion), which couples to the housing 302 of the transfer case 300 proximate the gear reduction mechanism 310, for example, with a thrust washer, an interference fit, and/or other fasteners. The actuator base 362 also includes a generally cylindrical body or body portion 362_b_ (e.g., a radially inner or annular portion or stem), which extends rearward axially away from the base portion 362_a_ toward the plate clutch 352. The actuator base 362 includes a central bore (not labeled) through which the primary output shaft 306 extends. Other components of the actuation system 361 are fixedly or movably coupled to the body portion 362_b_ as discussed below.

The motor 364, by way of the reduction gears 366, is configured to rotate the drive gear assembly 390 about the actuator base 362, which in turn causes the secondary torque transfer actuator mechanism 370 to operate the plate clutch 352 and causes the gear reduction actuator mechanism 380 to move the gear reduction hub 322. The motor 364 is fixedly coupled to, and the reduction gears 366 are rotatably coupled to the housing 302 at positions located radially outward of the primary output shaft 306.

The gear reduction actuator mechanism 380 functions as a cylindrical or barrel cam mechanism, which moves the gear reduction hub 322 between the first and second positions during the first stage (e.g., initial rotation of the drive gear assembly 390 from a center). The gear reduction actuator mechanism 380 includes a shift fork 382 and a barrel 384 (e.g., shift cam). With rotation, the barrel 384 is configured to displace the shift fork 382 forward and rearward axially within the transfer case 300, so as to move the gear reduction hub 322 between the first or forward position (i.e., in which the gear reduction hub 322 directly couples input shaft 304 and the primary output shaft 306; establishing the high range) and the second or rearward position (i.e., in which the gear reduction hub 322 couples the input shaft 304 and the primary output shaft 306 by way of the gear reduction mechanism 310; establishing the low range).

The shift fork 382 is a generally arcuate member positioned substantially within the central bore of the body portion 362*b* of the actuator base 362 and radially outward of the primary output shaft 306. The shift fork 382 is generally semicircular having an inner flange 382*a* that extends radially inward from an inner peripheral surface of the shift fork 382. The inner flange 382*a* is positioned between and engages radially outwardly extending, peripheral flanges of the gear reduction hub 322, such that axial movement of the shift fork 382 moves the gear reduction hub 322 axially between the first and second positions.

The shift fork 382 also includes two followers 382*b* configured as rollers, each extending radially outward from the outer peripheral surface of the shift fork 382 through an axially extending slot (not shown) in the body portion 362*b* of the actuator base 362 to be engaged by the barrel 384 (discussed below). The axially extending slot of the body portion 362*b* of the base maintains the shift fork 382 in a constant rotational position relative to the actuator base 362, while allowing the shift fork 382 to translate axially. The two followers 382*b* are positioned substantially opposite each other (i.e., approximately 180 degrees apart) at, or proximate to, ends of the shift fork 382. Each follower 382*b* is coupled to and rotates about an axle, which extends substantially radially outward from ends of the shift fork 382 (e.g., perpendicular to the outer peripheral surface). The shift fork 382 may additionally include a boss or protrusion for each follower 382*b* extending radially outward from the outer peripheral surface to which the axle is coupled.

The barrel 384 is a generally cylindrical member that surrounds the body portion 362*b* of the actuator base 362 and is configured to rotate thereabout to, thereby, axially move the shift fork 382. The barrel 384 includes an inner peripheral surface that bears against an outer peripheral surface of the body portion 362*b* of the actuator base 362. One or more thrust washers 367 and/or snap clips 368 are coupled to the outer periphery of the body portion 362*b* at an intermediate axial location thereof, as well as adjacent the base portion 362*a*. As the barrel 384 rotates about the body portion 362*b* of the base, edges of the barrel 384 may slide and bear against the thrust washers 367 to transfer an axial force for moving the gear reduction hub 322 relative to the actuator base 362 forward and rearward.

The barrel 384 includes an inner cam slot 384*a* configured to engage and axially move the shift fork 382 and, thereby, move the gear reduction hub 322 between the first and second positions. Each cam slot 384*a* extends radially outward from the inner peripheral surface with one of the followers 382*b* of the shift fork 382 being positioned in each slot 384*a*. Each cam slot 384*a* includes a movement region having opposed helically ramped surfaces that engage the follower 382*b* during the first movement stage (i.e., initial rotation of the barrel 384 and drive gear assembly 390 from center) to move the shift fork 382 axially forward and rearward. The movement region is flanked by dwell or flat regions in which the slot 384*a* maintains the follower 382*b* in a generally fixed axial position in the second movement stage (e.g., continued positive and negative rotation from respective ends of the first positive stage and the first negative stage) and any subsequent movement.

In order to rotate the barrel 384, the barrel 384 includes an outer radial flange or member 384*b*, which is positioned radially outward of an outer peripheral surface of the barrel 384 and extends axially rearward from a forward end of the barrel 384. The outer radial member 384*b* is engaged by a torsion spring 386, which transfers torque from the drive gear assembly 390 to rotate the barrel 384. More particularly, the torsion spring 386 is positioned between the outer peripheral surface of the barrel 384 and the outer radial member 384*b* and is wound about and bears against the outer peripheral surface of the barrel 384. The torsion spring 386 includes two ends 386*a* that extend radially outward to engage axially-extending edges of the outer radial member 384*b* and to engage the drive gear assembly 390 to transfer torque therebetween. In the case of a blocked shift event (i.e., when splines of the reduction hub 322 engage ends of splines of the input shaft 304 or planet carrier (not shown, refer to gear reduction mechanism 210 above) of the gear reduction mechanism 310), the torsion spring 386 allows for relative rotational motion between the barrel 384 and the drive gear assembly 390, while storing energy that causes axial movement of the reduction hub 322 once properly aligned with the input shaft or gear reduction mechanism 310.

The secondary torque transfer actuator mechanism 370 functions as a face cam mechanism (e.g., a face cam mechanism, such as a ball ramp mechanism) to convert continued rotation of the drive gear assembly 390 into axial movement for operating the plate clutch 352 within the second stage of rotational movement (e.g., continued rotation from approximate ends of the first stage). The secondary torque transfer actuator mechanism 370 includes a forward member 372 (e.g., first plate, ring, or cam member) and a rearward member 374 (e.g., second plate, ring, or cam member), which are configured for relative rotation therebetween and resultant relative axial displacement for engaging the plate clutch 352. Both the forward member 372 and the rearward member 374 include central apertures or bores through which the primary output shaft 306 extends. The forward member 372 is coupled to a rearward end of the body portion 362*b* of the actuator base 362, while the rearward member 374 is configured to both rotate and move axially relative to the forward member 372 and, thereby, move the actuator base 362. For example, as shown, the forward member 372 is positioned within the central bore extending through the body portion 362*b* of the actuator base 362 and may be coupled thereto by a press-fit, interference fit, or splined connection. The forward member 372 is positioned against a bearing member coupled to the output shaft 306 to prevent forward axial movement thereof. The rearward member 374 is configured to be rotated by the drive gear assembly 390 relative to the forward member 372, as discussed in further detail below, and is positioned to press the apply plate 352*c* via an intermediate bearing. The intermediate bearing allows the apply plate 352*c* to spin with the output shaft 306 independent of the rearward member 374, which rotates back and forth within a limited range of motion of the second stage.

At least one of the forward member 372 or rearward member 374 includes an inner surface (i.e., facing the other plate; not shown) that includes two movement advance regions that are helically ramped in opposite directions. Each of a plurality of followers or rollers (e.g., balls) bear against the inner surfaces of both members 372, 374, such that rotation of the rearward member 374 from a center causes the rearward member 374 to displace rearward axially to engage the apply plate 352*c* of the plate clutch and, thereby, operate the secondary torque transfer mechanism 351. As discussed below, the drive gear assembly 390 is configured to not engage the followers 374*a* during the first movement stage (e.g., initial rotation of the drive gear assembly 390 from center), so as to not operate the secondary torque transfer actuator mechanism 370. However, the forward and rearward members 372, 374 may instead or additionally include dwell regions for the first movement stage in which rotation does not cause axial movement of the rearward member 374 and/or any subsequent movement stage.

In order to rotate the rearward member 374 relative to the forward member 372, the rearward member 374 is configured to receive application of one or more tangential forces from the drive gear assembly 390 (discussed in further detail below). The rearward member 374 includes one or more followers 374*a* configured as rollers extending radially outward from a periphery of the rearward member 374. For example, the rearward member 374 may include two followers 374*a* that are positioned substantially opposite each other (i.e., approximately 180 degrees apart). Each follower 374*a* is coupled to and rotates about an axle, which extends radially from the periphery of the rearward member 374 (e.g., perpendicular to an outer surface thereof). The rearward member 374 may additionally include a boss or protrusion for each follower 374*a* extending radially outward from the periphery of the rearward member 374 to which the axle and follower 374*a* are coupled.

As mentioned previously, the drive gear assembly 390 is configured to be rotated by the motor 364 via the reduction gears 366 in order to operate the secondary torque transfer actuator mechanism 370 and the gear reduction actuator mechanism 380. The drive gear assembly 390 generally includes a sense plate 392 (e.g., a first plate), hub 394 (e.g., actuator member), and gear plate 396 (e.g., a second plate), which are fixedly coupled to each other to be rotated in unison by the motor 364. When the motor 364 drives the gear plate 396 by way of the reduction gears 366, the hub 394 engages the followers 374*a* to operate the secondary torque transfer actuator mechanism 370, and the sense plate 392 engages the torsion spring 386 to operate the gear reduction actuator mechanism 380. The drive gear assembly 390 is positioned about the actuator base 362 with an inner peripheral surface of the hub 394 bearing on the outer peripheral surface of the body portion 362*b* of the actuator base 362. The drive gear assembly 390 is held axially on the actuator base 362 between one of the thrust washers 367 and an end plate coupled to the body portion 362*b* of the base 362. While the drive gear assembly 390 may alternatively be provided as a single component or two primary components, an assembly of the sense plate 392, hub 394, and gear plate 396 may provide for less complicated manufacturing, while allowing each component to be configured individually (e.g., to optimize material type according to strength, weight, and cost considerations).

The gear plate 396 is configured to receive an input torque from the motor 364 via the reduction gears 366 through a first movement stage, second movement stage, and any subsequent movement stages of the drive gear assembly 390. The gear plate 396 is a unitary, generally planar member having a central bore or aperture defined by an inner periphery 396*a* and an outer periphery 396*b*. The primary output shaft 306, along with other components of the actuator 361, extends through the central aperture. The outer periphery 396*b* includes a plurality of teeth that mesh with mating teeth of the reduction gears 366, so as to be rotated by the motor 364. Because the actuator 361 operates within a limited range of rotational motion in the first and second movement stages (e.g., +/−60 degrees), as described above for operating both the secondary torque transfer actuator mechanism 370 and the gear reduction actuator mechanism 380, only a portion of the outer periphery 396*b* (e.g., 180 degrees) may include teeth. The gear plate 396 may, for example, be made from powdered metal steel and, as discussed in further detail below, may include various features to facilitate coupling to the sense plate 392 and/or hub 394.

The sense plate 392 is configured to be driven by the gear plate 396 for operating the gear reduction actuator mechanism 380. The sense plate 392 may also be configured with a position sensor 369 for monitoring the rotational position of the actuator 361. The sense plate 392 is a unitary member, which generally includes a planar portion 392*a* with a central bore or aperture defined by an inner periphery 392*b*, and also includes first and second annular flanges 392*c*, 392*d*, which extend forward axially from an outer periphery of the planar portion 392*a*. In the drive gear assembly 390, the planar portion 392*a* is positioned forward of and adjacent to a forward surface of the gear plate 396. The first flange 392*c* extends substantially circumferentially (e.g., approximately 270 degrees) about the outer periphery of the planar portion 392*a*. The second flange 392*d* is configured relative to the outer radial member 384*b* of the barrel 384 to transfer torque therebetween via the torsion spring 386. More particularly, the second flange 392*d* is positioned between the circumferential ends of the first flange 392*c* and has a width that is complementary to the width of the outer radial member 384*b* of the barrel 384, such that both the outer radial member 384*b* of the barrel cam 384 and the second flange 392*d* of the sense plate 392 are positioned between and engaged by the ends 386*a* of the torsion spring 386. The second flange 392*d* is additionally, positioned radially between the coil of the torsion spring 386 and the outer radial member 384*b* of the barrel cam 384. The sense plate 392 may, for example, be made from stamped steel, and as discussed in further detail below, may include various features to facilitate coupling to the hub 394 and/or gear plate 396.

The hub 394 is configured to be driven by the gear plate 396 to operate the secondary torque transfer actuator mechanism 370, for example, in limited ranges of motion of the drive gear assembly 390. During the first movement stage (e.g., initial rotation from center in which the secondary torque transfer actuator mechanism 370 moves the gear reduction hub 322, as discussed previously), the hub 394 rotates freely of the secondary torque transfer actuator mechanism 370, so as to not engage the plate clutch 352. During continued rotation in the second movement stage (e.g., continued positive and negative rotation from respective ends of the first stage), the hub 394 engages the secondary torque transfer actuator mechanism 370. The hub 394, for example, rotates about a common axis with the rearward member 374 (e.g., the axis of the primary output shaft 306).

The hub 394 is a unitary member, which generally includes a base portion 394*a* (e.g., radial flange) with a central aperture, and includes an annular body 394*b* extending axially from an inner periphery of the base portion 394*a*, which rotates about and bears against the body portion 362*b* of the actuator base 362. As part of the drive gear assembly 390, the annular body 394*b* extends rearward through the central apertures of the sense plate 392 and gear plate 396 with the sense plate 392 being held between the base portion 394*a* of the hub 394 and the gear plate 396. The hub 394 may, for example, be made from powdered metal steel and, as discussed in further detail below, may include various features to facilitate coupling to the sense plate 392 and/or gear plate 396.

The sense plate 392, hub 394, and gear plate 396 are fixedly coupled together to form the drive gear assembly 390 and to rotate in unison as a single unit. According to the embodiment shown in FIGS. 3-5, the sense plate 392, hub 394, and gear plate 396 are coupled together via a press-fit, splined arrangement. More particularly, the annular body 394*b* (e.g., inner peripheral flange) of the hub 394 is configured to be inserted into the central bore of the sense plate 392 and the central bore of the gear plate 396. The diameter of the outer surface of the annular body 394*b* of the hub 394 nominally has an outer diameter that is slightly smaller than the inner diameters of the inner peripheries 392*b* and 396*a* of the sense plate 392 and gear plate 396, respectively. The annular body 394*b* includes a plurality of coupling splines 394*j* extending axially and protruding radially outwardly from the outer surface in one or more regions to tightly engage and couple to the inner peripheries 392*b* and 396*a* of the sense plate 392 and gear plate 396. The coupling splines 394*j* may, for example, be configured to deform or cut material forming the inner peripheries 392*b* and 396*a* as the sense plate 392 and gear plate 396 are pressed successively onto the annular body 394*b* of the hub 394. The annular body 394*b* may additionally include one or more alignment splines 394*k* extending axially and protruding radially outwardly from the outer surface at one or more locations to be received within alignment slots 392*f* and 396*c* of the sense plate 392 and gear plate 396, respectively. During operation, the motor 364 by way of the reduction gears 366 engages and rotates the gear plate 396, which transfers torque to the hub 394 by way of the splined connection, which in turn transfers torque to the sense plate 392 by way of the splined connection.

Figure 6:
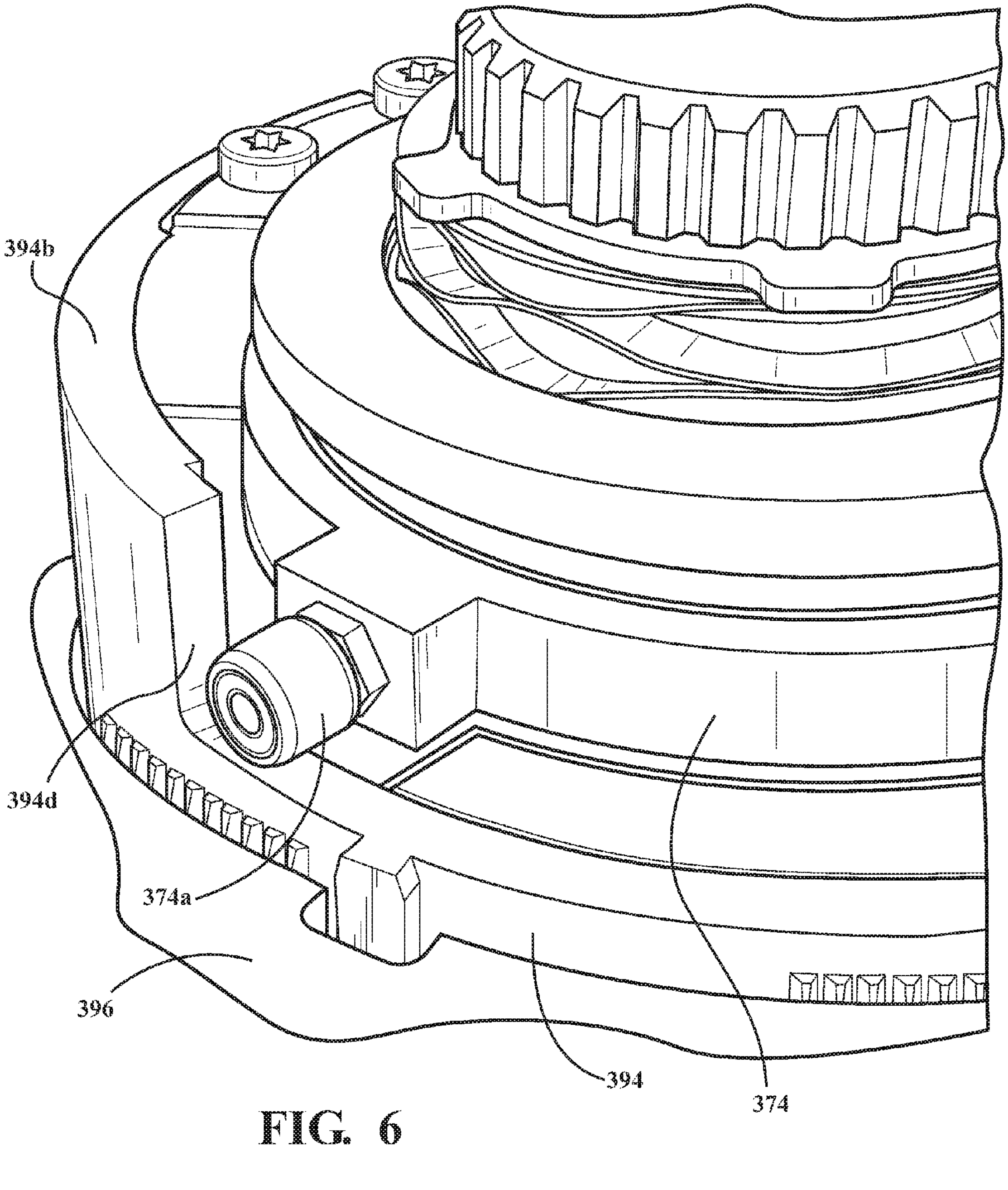
FIG. 6 is a perspective view of a partial actuation system for a transfer case according to an exemplary embodiment.

The hub 394 additionally defines slots or cutouts 394*c* (e.g., two slots) in the annular body 394*b* in which the followers 374*a* of the secondary torque transfer actuator mechanism 370 are positioned (see, e.g., FIG. 6). Each slot 394*c* is defined between two end walls or tracks 394*d* (e.g., circumferentially opposed end walls) of the annular body 394*b*, which extend axially rearward. The slots 394*c* are sized equally and are circumferentially spaced according to spacing of the followers 374*a* to provide simultaneous engagement of the followers 374*a* during rotation of the drive gear assembly 390. During the first movement stage, the followers 374*a* each remain in a middle region of the slot 394*c* between the opposed end walls 394*d*. With continued rotation in the second movement stage, each of two end walls 394*d*, one from each slot 394*c*, simultaneously engage and apply a tangential force to one of the followers 374*a* to rotate the rearward member 374 of the secondary torque transfer actuator mechanism 370. With this rotation, the rearward member 374 displaces axially rearward from the forward member 372 (i.e., so as to compress the plate clutch 352), while the followers 374*a* roll rearward along the opposed end walls 394*d*. The end walls 394*d* have an axial length allowing the followers 374*a* to travel thereon through the full range of axial displacement of the secondary torque transfer actuator mechanism 370.

As force is applied to the end walls 394*d* by the followers 374*a*, localized contact stress (e.g., Hertzian stress) develops on a flat surface of the end wall 394*d* at the interface with the curved surface of the follower 374*a*. Depending on the peak output of the actuator 361 (e.g., torque applied by the motor 364 by way of the reduction gears 366 and gear plate 396) the material properties of the hub 394, this localized peak contact stress may cause yielding or fatigue of the hub 394 in the region of the end walls 394*d*, for example, during blocked shift conditions. According to one exemplary embodiment, the entire hub 394 is made from a single material (e.g., powdered metal steel), which provides sufficient strength to prevent yielding from expected peak localized contact stress of the end walls 394*d* and to prevent fatigue from repeated loading of the end walls 394*d*. For example, the yield strength may be greater than approximately 1.5 to 2.0 times the peak expected contact stress.

According to another exemplary embodiment, the hub 394 is treated (e.g., by anodizing, case hardening, etc.) to harden the material of the hub 394, including the end walls 394*d*, to provide sufficient strength to prevent yielding from expected peak localized contact stress of the end walls 394*d* and to prevent fatigue from repeated loading of the end walls 394*d*. For example, after treating or hardening, the yield strength may be greater than approximately 1.5 to 2.0 times the peak expected contact stress.

According to the other exemplary embodiments discussed in further detail below, the hub 394 includes a bearing member (498, 598, etc.) coupled to one or more of the end walls (e.g., 498*d*, 598*d*, etc.). Each bearing member (498, 598, etc.) has greater yield strength, generally correlated to hardness and tensile strength, that is sufficient to prevent deformation from the expected peak contact stress applied thereto by the follower 374*a*. The bearing member functions to broadly distribute force from the localized contact stress from the follower 374*a* across the end wall 394*d*. The bearing member, thereby, may prevent localized yielding of the end wall 394*d* of the hub 394, as well as prevent deformation caused by fatigue from cyclical loading. Advantageously, use of a bearing member allows the remainder of the hub (e.g., 498, 598, etc.) to be made from lesser amounts of materials or lower strength materials (e.g., having lower hardness), which may provide weight and cost advantages over the hub 394. For example, the bearing member may be made from a stamped or powdered metal steel that may be treated or untreated, while the hub is made from another material having a lower yield strength and/or a lower density (e.g., powdered light metal, such as aluminum, magnesium, and alloys thereof, composite, or polymer). Each bearing member may also provide a larger surface area (e.g., being wider) than the end wall 394*d* to which it is coupled and functions to broadly distribute the localized contact stress from the follower 374*a* across the end wall 394*d* to.

In each embodiment, the bearing member is cooperatively configured with the end wall (e.g., 494*d*) to provide a travel surface substantially parallel with the axis of the primary output shaft 306 (i.e., axial direction) and to provide sufficient circumferential travel within the slot (e.g., 494*c*) for proper actuation of the secondary torque transfer actuator mechanism 370. Reference numerals referring to portions of the hub 394 or other primary components of the actuation system 361 (e.g., gear plate 396 and member 374 of the actuator mechanism 370) are advanced by 100 for each embodiment below, while the discussion and figures may refer to only a subset of such reference numerals for readability. It should be further noted that, depending on the configuration of the secondary torque transfer actuation mechanism 370, the secondary torque transfer mechanism 351, and the actuator 361, the bearing member (e.g., 498) may be provided only on one end wall (e.g., 494*d*) of each slot (e.g., 494*c*), for example, if in the second range of motion of the gear plate assembly (e.g., 490), either positive or negative rotation does not operate the secondary torque transfer mechanism 351 (e.g., if the second member 374 advances to compress the plate clutch 352 in only one direction of rotation, either positive or negative).

Figure 7:
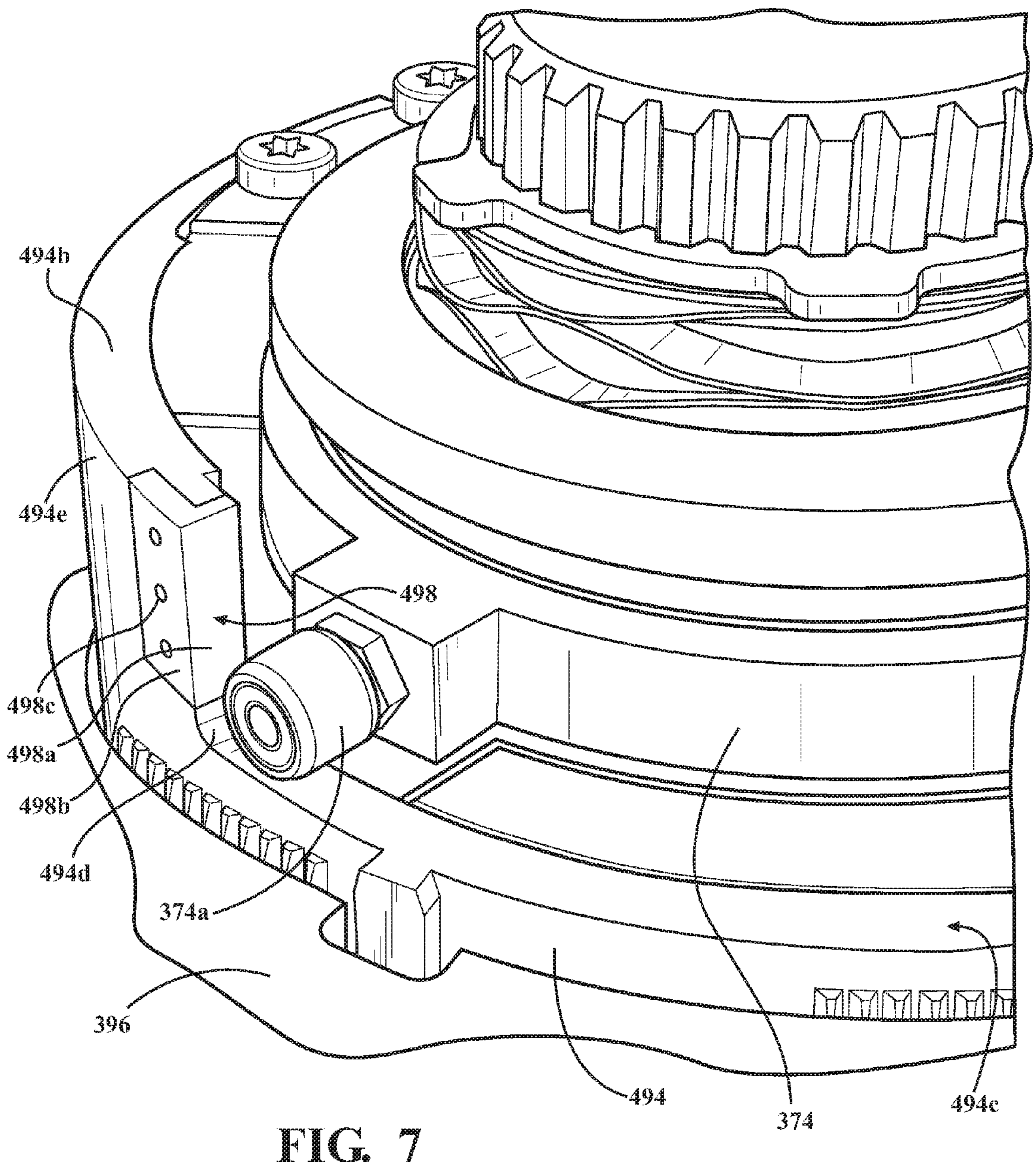
FIG. 7 is a perspective view of a partial actuation system for a transfer case according to another exemplary embodiment.

According to a first embodiment of the bearing member 498 shown in FIG. 7, the bearing member 498 has a generally L-shaped cross-section with a bearing segment or portion 498*a* that extends radially outward to a coupling segment or portion 498*b* that extends in a circumferential direction. The bearing segment 498*a* forms a bearing surface that defines an end of the slot 494*c* to contact the follower 374*a*, and a rear surface that is positioned against the end wall 494*d* of the hub 494 to distribute the local contact force from the follower 374*a* of the rearward member 374 along the end wall 494*d*. The coupling segment 498*b* forms a flange positioned against a radially outer surface 494*e* of the annular body 494*b* of the hub 494 and is configured for coupling the bearing member 498 thereto via conventional fasteners 498*c*, such as threaded fasteners, rivets, and/or adhesives. The coupling segment 498*b* may be positioned at least partially within an outer groove of the hub 494 proximate the end wall 494*d* (as shown), entirely within an outer groove of the hub 494 (e.g., to be flush or recessed relative to the radially outer surface 494*e* of the annular body 494*b* of the hub 494), or may be entirely proud of the radially outer surface 494*e*.

Figure 8B:
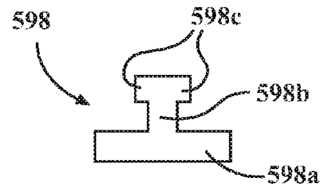
FIG. 8B is an end view of a bearing member of the actuation system shown in FIG. 8A.
Figure 8A:
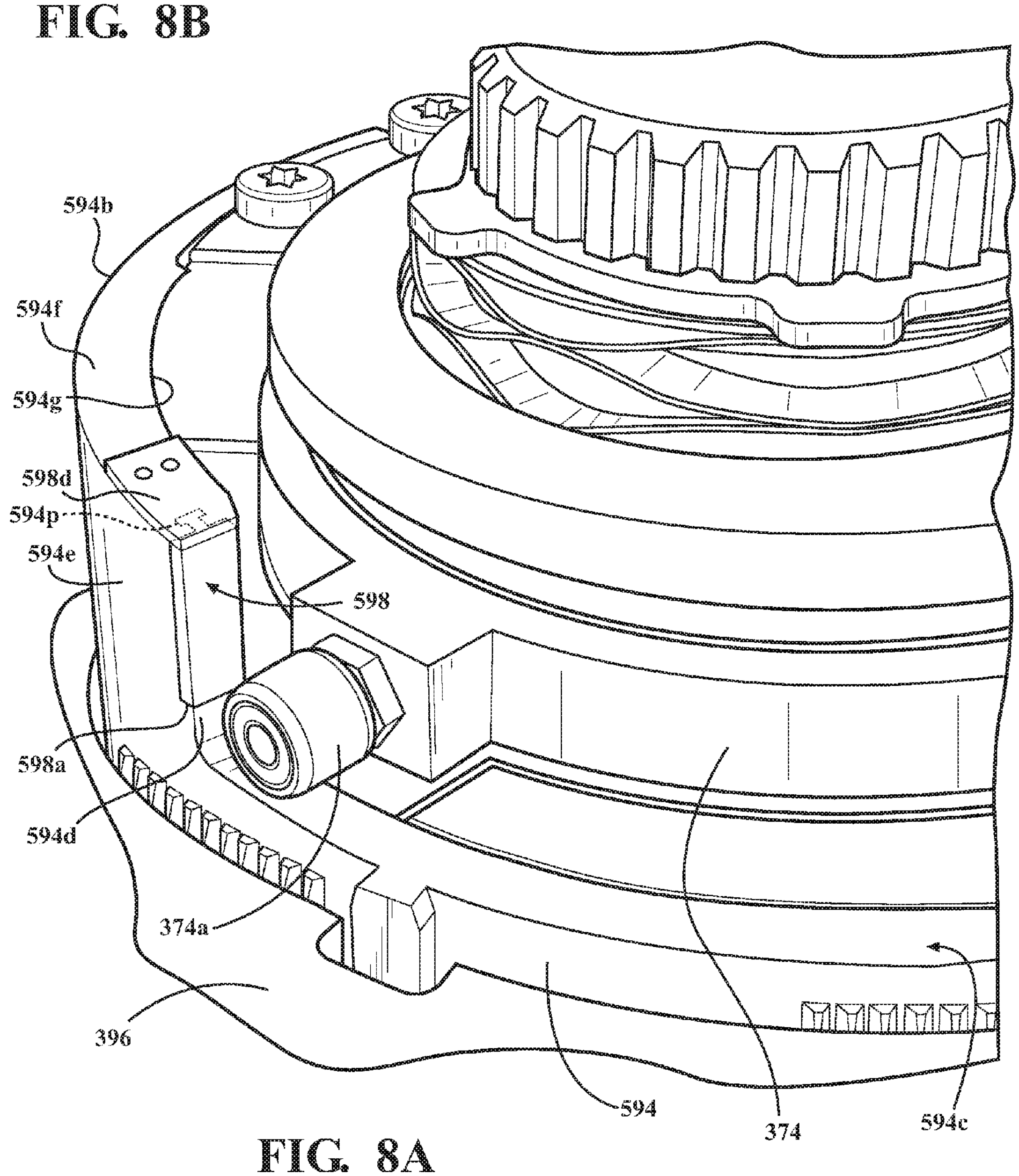
FIG. 8A is a perspective view of a partial actuation system for a transfer case according to another exemplary embodiment.

According to a second embodiment of the bearing member 598 shown in FIG. 8, a bearing member 598 has a generally T-shaped cross-section with a bearing segment 598*a* that forms a bearing surface defining an end of the slot 594*c* to contact the follower 374*a*, and a rear surface that is positioned against the end wall 594*d* of the hub 594 to distribute the local contact force from the follower 374*a* along the end wall 594*d*. The bearing member 598 further includes a coupling segment 598*b* extending circumferentially (i.e., outward relative to the slot 594*c*) from a central position of the rear surface of the bearing segment 598*a*, which may include barbs 598*c* extending from or proximate an end thereof in inward and outward radial directions. The coupling segment 598*b* is received within an axially extending slot 594*p* (e.g., complementary slot) (i.e., outlining the coupling segment 598*b* and barbs 598*c*; shown in phantom in FIG. 8A) in the end wall 594*d* of the hub 594 between the radially outer surface 594*e* and a radially inner surface 594*g* of the annular body 594*b*. The axially extending slot in the end wall 594*d* has a cross-sectional profile complementary to that of the coupling segment 598*b* of the bearing member 598 (i.e., to receive the coupling segment 598*b* and its barbs 598*c*), which prevents both circumferential and radial movement of the bearing member 598 relative to the hub 594. Axial movement of the bearing member 598 relative to the hub 394 may be prevented with a friction fit therebetween (i.e., the coupling segment 598*b* being received slot 594*p*) and/or a retaining member or flange 598*d* positioned against and fastened to (e.g., with conventional fasteners and/or adhesives) an axial facing surface 594*f* of the flange 594*c* of the hub 394. The retaining member 598*d* may be part of the bearing member 598 or positioned against an axially facing surface thereof.

Figure 9:
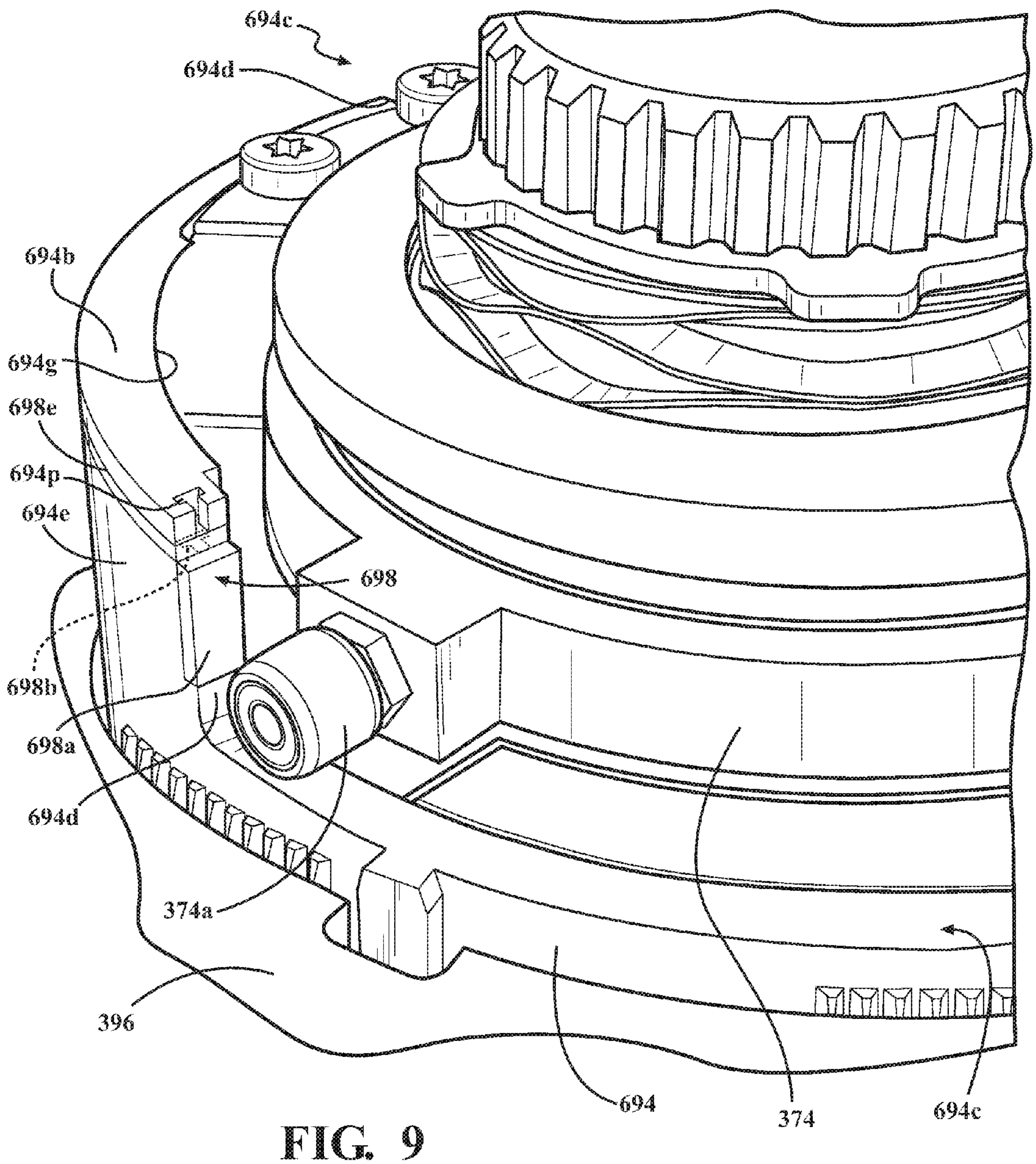
FIG. 9 is a perspective view of a partial actuation system for a transfer case according to another exemplary embodiment.

According to another exemplary embodiment shown in FIG. 9, a bearing member 698 is configured substantially similarly to bearing member 598, including a generally T-shaped cross section with a bearing segment 698*a* and a coupling segment 698*b* (i.e., shown in phantom in FIG. 9) to be received in a complementary axially extending slot 694*p* in the annular body 694*b* of the hub 694). To prevent axial movement of the bearing member 698 relative to the hub 694, a clip member 698*e* (e.g., made from a sprung metal, such as steel) is received within or snapped into a circumferential groove machined or otherwise formed in the radially outer surface 694*e* (i.e., shown surrounding the clip member 698*e*) of the annular body 694*b* of the hub 694. The clip member 698*e* extends radially inward across the end wall 694*d* and may, for example, have a sprung end (not shown) that presses against the radially inner surface 694*g* of the annular body 694*b* of the hub 694. The clip member 698*e* engages an axially facing surface or end of the bearing member 698 to prevent axial movement of the bearing member 698. The clip member 698*e* may also extend circumferentially to the second slot 694*c* of the hub 694 so as to similarly retain a bearing member against the end wall 694*d* thereof. The axial length of the annular body 694*b* may require being extended as compared to other bodies, so as to provide sufficient room to include the annular groove for receiving the clip member 698*e*, while still providing sufficient travel for the roller 374*a* along the bearing segment 698*a* of the bearing member 698.

Figure 10B:
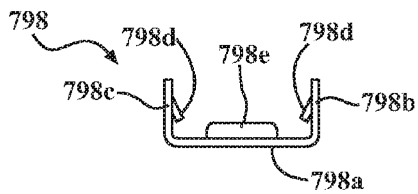
FIG. 10B is an end view of a bearing member of the actuation system shown in FIG. 10A.
Figure 10A:
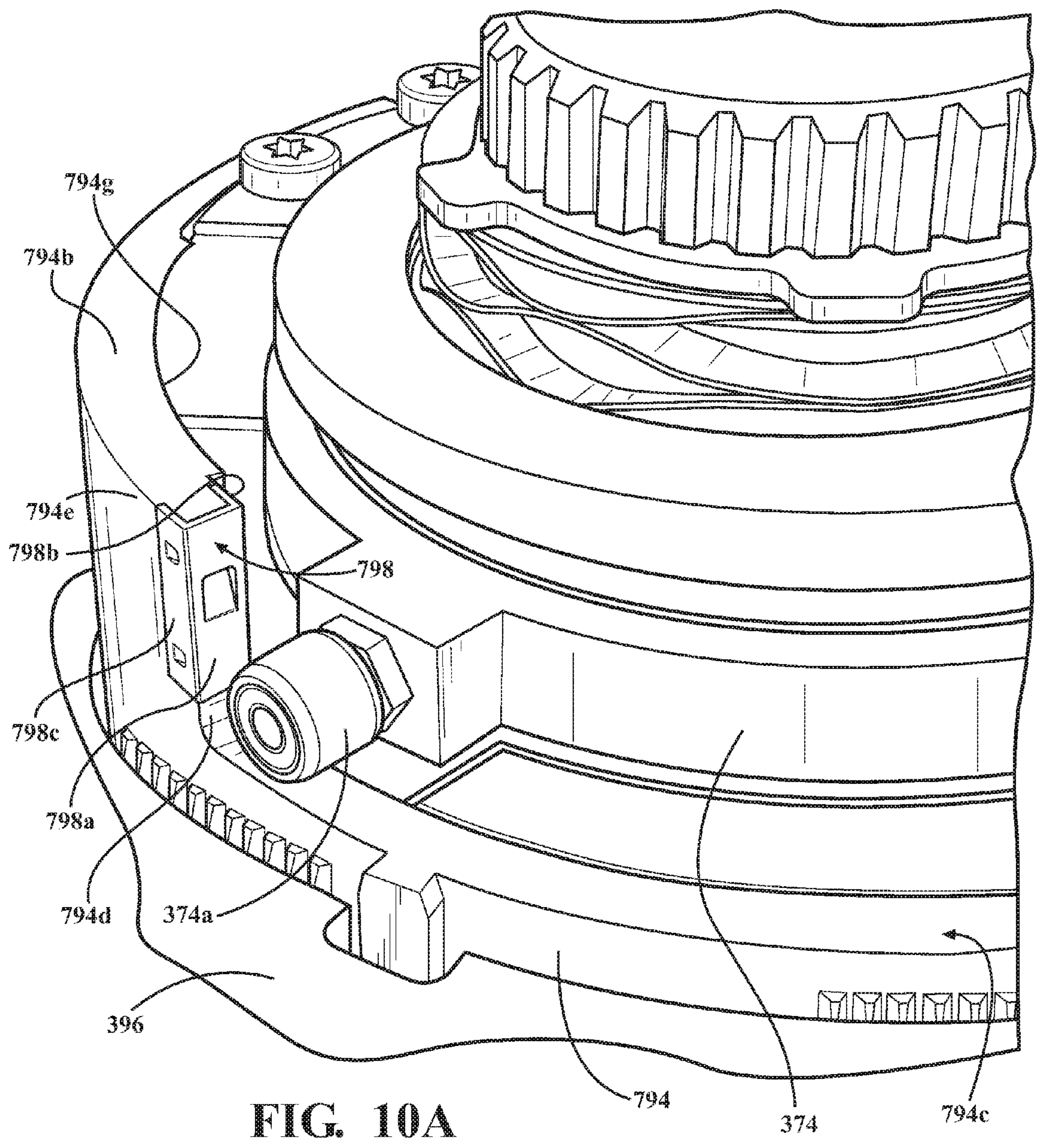
FIG. 10A is a perspective view of a partial actuation system for a transfer case according to an exemplary embodiment.

According to yet another exemplary embodiment shown in FIGS. 10A and 10B, a bearing member 798 has a generally U-shaped configuration and is received over the end wall 794*d* of the hub 794. The bearing member 798 includes a bearing segment 798*a* and coupling segments 798*b*, 798*c* forming legs extending circumferentially away from the base portion 798*a* to surround the end wall 794*d* of the hub 794. The bearing segment 798*a* includes a bearing surface that defines an end of the slot 794*c* to contact the follower 374*a*, and a rear surface of the bearing segment 798*a* is positioned against the end wall 794*d* of the hub to distribute the local contact force from the follower 374*a* along the end wall 794*d*. The coupling segments 798*b*, 798*c* may compress therebetween the annular body 794*b* adjacent the end wall 794*d* of the hub 794. The bearing member 798 may instead or additionally include tabs or prongs 798*d* that extend from the coupling segments 798*b*, 798*c* to engage the outer and inner radial surfaces 794*e*, 794*g* of the annular body 794*b* of the hub 794 to prevent movement of the bearing member 798 relative to the annular body 394*b*. The bearing member 798 may also include one or more tabs or prongs 798*e* that extend from the bearing segment 798*a* to engage the end wall 794*d* of the hub 794 to further prevent movement of the bearing member 798 relative to the annular body 794*b*. For example, the tabs 798*d*, 798*e* may be pressed into the material forming the end wall 794*d* of the hub 794 to retain the bearing member 798 thereon (i.e., to prevent backoff).

While the disclosure has been made in connection with what is presently considered to be the most practical and preferred embodiment, it should be understood that the disclosure is intended to cover various modifications and equivalent arrangements.

What is claimed is:

1. A transfer case comprising:

a primary output shaft;

a secondary output shaft selectively coupleable to the primary output shaft with a secondary torque transfer mechanism to transfer torque from the primary output shaft to the secondary output shaft and an actuator comprising:

- a hub member comprising an annular body defining a circumferential slot having
- a bearing member coupled to the annular body and positioned in the slot, wherein the bearing member includes a bearing surface that extends in an axial direction relative to the annular body; and a face cam mechanism that displaces in the axial direction when rotated by the hub member to operate the secondary torque transfer mechanism, wherein the face cam mechanism includes a follower member that is engaged by the bearing member and moves axially along the bearing surface when the face cam is rotated by the hub member, wherein the annular body includes an end wall at a circumferential end of the circumferential slot, the bearing member is formed from a material that is harder than another material forming the end wall, and the bearing member distributes localized force from the follower across the end wall.

2. The transfer case according to claim 1, wherein the bearing member includes a bearing segment forming the bearing surface, and a coupling segment coupled to the annular body.

3. The transfer case according to claim 2, wherein the bearing segment includes a rear surface opposite the bearing surface, the rear surface being engaged with the end wall to distribute force thereacross.

4. The transfer case according to claim 2, wherein the bearing member is coupled to the annular body by at least one of a fastener, or the coupling segment being received within a complementary slot of the annular body.

5. The transfer case according to claim 4, wherein the fastener is a clip member received within an annular groove in the annular body.

6. The transfer case according to claim 1, wherein the hub member is configured to rotate in a first range of motion independent of the face cam mechanism in which the bearing member does not engage the follower, and in a second range of motion in which the bearing member engages the follower to rotate the face cam mechanism.

7. The transfer case according to claim 6, wherein the secondary torque transfer mechanism includes a plate clutch, wherein in the second range of motion, the face cam mechanism displaces axially to compress the plate clutch to selectively couple the primary output shaft to the secondary output shaft.

8. The transfer case according to claim 7, wherein the secondary torque transfer mechanism includes a first sprocket coupled to a housing of the plate clutch to be selectively coupled to the primary output shaft, a second sprocket coupled to the secondary output shaft, and a chain coupling the first sprocket to the second sprocket to transfer torque therebetween.

9. The transfer case according to claim 6, further comprising an input shaft and a gear reduction mechanism configured to couple the input shaft to the primary output shaft selectively between a first drive ratio and a second drive ratio, wherein the actuator is configured to operate the gear reduction mechanism in the first range of motion to selectively couple the input shaft to the primary output shaft in the first drive ratio or the second drive ratio, and operate the secondary torque transfer mechanism in the second range of motion that is different from the first range of motion.

10. The transfer case according to claim 1, wherein the follower is a roller configured to roll along the bearing surface.

11. The transfer case according to claim 1, wherein the hub member includes two slots, each slot being defined by two end walls and having one of the bearing members coupled to each end wall; and wherein the face cam mechanism includes two followers that are rollers, each follower being positioned in one of the two slots and being configured to roll along the bearing surface of each bearing member of the slot in which the roller is positioned.

12. The transfer case according to claim 1, wherein the face cam mechanism includes a first cam member and a second cam member, wherein the first cam member is fixed axially with respect to the hub, the follower is coupled to the second cam member, and the second cam member is rotatable by the hub relative to the first cam member to displace axially relative to the first cam member.

13. An actuator for a transfer case comprising:

an actuator member including a circumferential slot defined between two end walls formed by an annular body, at least one of the end walls having a bearing member coupled thereto and forming a bearing surface extending in an axial direction relative to the annular body;

a face cam mechanism including a first cam member, a second cam member, and a follower coupled to the second cam member, wherein the second cam member is configured to displace axially relative to the first cam member when rotated relative to the first cam member, the follower being disposed within the slot; and a motor configured to rotate the annular body in a first range of motion independent of the face cam mechanism, and in a second range of motion in which the bearing member engages the follower to rotate the second cam member relative to the first cam member and in which the follower moves axially along the bearing surface of the bearing member, wherein the bearing surface is formed from a material that is harder than another material forming the end wall to which the bearing member is coupled.

14. The actuator according to claim 13, wherein the bearing member includes a bearing segment and a coupling segment, the coupling segment being coupled to the annular body, and the bearing segment forming the bearing surface and a rear surface engaged with the end wall.

15. The actuator according to claim 13, wherein the actuator member and the second cam member rotate about a common axis.

16. A transfer case comprising:

a primary output shaft;

a secondary output shaft;

a torque transfer mechanism that selectively couples the primary output shaft to the secondary output shaft to transfer torque therebetween; and an actuator comprising:

a face cam configured to displace axially when rotated for operating the torque transfer mechanism, the face cam including a follower that extends radially outward;

an annular member defining a circumferential slot, the annular member including an end wall at a circumferential end of the circumferential slot, the follower being positioned in the circumferential slot;

a bearing member coupled to the end wall and extending an axial direction relative to the annular member, wherein the bearing member is harder than the end wall; and an electric motor that rotates the annular member in a first range of motion in which the face cam is stationary and in a second range of motion in which the bearing member engages the follower to rotate the face cam and in which the follow moves axially along the bearing member, the bearing member distributing localized force from the follower across the end wall.

* * * * *